Patented Jan. 7, 1941

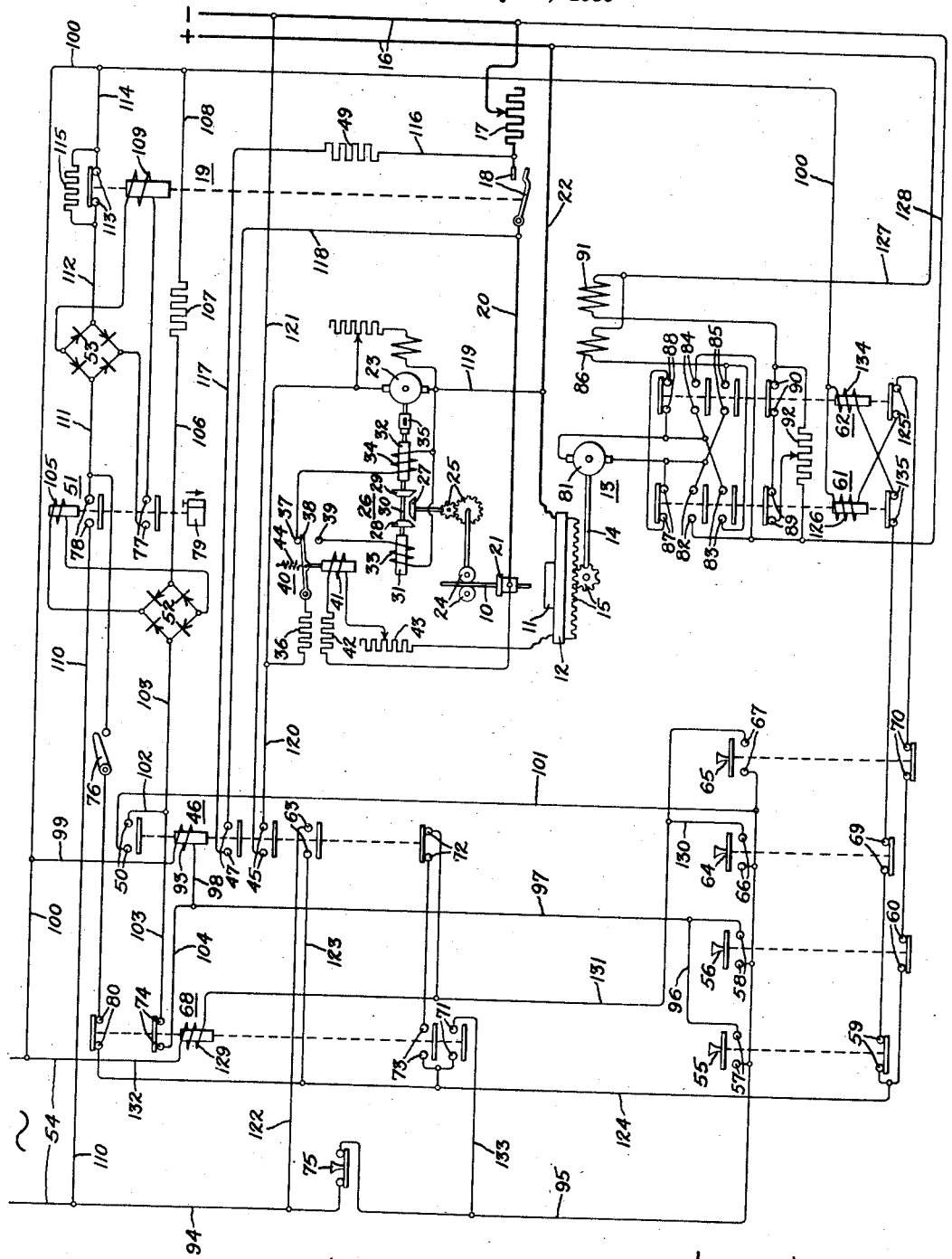

2,227,960

UNITED STATES PATENT OFFICE 2,227,960

AUTOMATIC ARC WELDING CONTROL SYSTEM

James T. Catlett, Scotia, N. Y., assignor to General Electric Company, a corporation of New York Application July 13, 1939, Serial No. 284,289

13 Claims. (Cl. 219—8)

My invention relates to arc welding, and more particularly to an improved automatic arc welding control system.

In automatic arc welding systems wherein the welding operation is initiated by connecting a source of arc welding current and voltage to the electrodes through the agency of a switch having a greater operating inertia than the regulator simultaneously connected across the electrodes for feeding said electrodes toward one another when the voltage across them is greater than a predetermined value and away from one another when the voltage across them is less than a predetermined value, the electrodes are fed away from one another during the closing period of this switch. Consequently, after the switch closes, the electrodes must be fed through a greater distance than that determined by their initial spacing and it is possible for the feeding mechanism to build up inertia forces which increases the difficulty of starting the arc and may result in a poor weld at the beginning of a welding operation. Furthermore, due to the fact that the starting of the welding arc lags the closing of the switch by a substantial time interval, it is necessary to complicate the traversing control by means of which the welding arc and work are moved relative to one another to compensate for this late starting of the arc.

It is an object of my invention to provide a control system of the type above described in which the welding arc is initiated at practically the same instant that welding current and voltage is applied to the electrodes.

It is a further object of my invention to facilitate arc starting by providing an automatic arc welding control in which the electrodes are rapidly fed through a very short distance into and out of engagement with one another by the electrode feeding mechanism during the period required for connecting said electrodes to a source of arc welding current and voltage.

Another object of my invention is to provide a control in which the starting time of the arc is reduced to such a small value that it is possible to start the traversing movement between the welding arc and the work at about or at the same time that the welding contactor closes to supply welding current and voltage to the electrodes.

Further objects of my invention will become apparent from a consideration of the following description of one embodiment thereof diagrammatically illustrated in the accompanying drawing in which the switches, relays and regulator are shown in the positions they assume when de-energized.

In the system illustrated, the cooperating arc welding electrodes are illustrated at 10 and 11. The electrode 11 is the work which is supported on a travel carriage 12. This travel carriage is moved to the right or left relative to the electrode 10 by a travel motor 13 which is connected therewith through the shaft 14 and gearing 15.

Arc welding current and voltage is supplied to the electrodes 10 and 11 from a source 16 through a welding circuit including an adjustable stabilizing resistance 17, contacts 18 of an electromagnetic switch or contactor 19, conductor 20, nozzle member 21, travel carriage 12, and conductor 22.

The electrode 10 is fed to and from the work 11 to strike and maintain a welding arc through the agency of any suitable feeding means. The arrangement illustrated is of the electromechanical type. It comprises a constant speed motor 23 which is connected to the electrode feed rolls 24 through gearing 25 and a clutch mechanism 26. This clutch mechanism comprises a driven element 27 and two driving elements 28 and 29. The driving elements are rotated in the same direction by the feed motor 23 and are located relative to the driven element so that its engagement with one or the other of the driving elements causes it to rotate in opposite directions to rotate the feed rolls 24 in opposite directions. The driving elements are mounted on a shaft 30 upon which are mounted cores 31 and 32. These cores are under the control of operating coils 33 and 34 and depending upon which coil is energized, element 28 or 29 will be caused to engage element 27. In order to permit this relative movement, an adjustable coupling 35 is provided between the shaft 30 and the motor 23.

The operating coils 33 and 34 of this clutch mechanism are energized through a circuit including resistance 36 and the contacts 37, 38 and 39 of a voltage regulator or relay 40 whose operating coil 41 is connected across the welding electrodes through a circuit including a fixed resistance 42 and an adjustable resistance 43. Until the operating coil of the voltage relay 40 is sufficiently energized by the voltage across the welding electrodes, its contacts 37 and 38 are closed through the biasing force of a spring 44. It will thus be seen that the electrode feeding mechanism just described operates in response to variations in voltage across the welding electrodes 10 and 11 to feed the electrode 10 relative to the electrode 11 in a manner to strike and thereafter maintain a welding arc of predetermined length and voltage depending upon the setting of the variable resistance 43 in circuit with the operating coil 41 of the voltage relay.

The operating circuit for the feed motor 23 and the circuit through the contacts of the voltage relay 40 are completed across the source of supply 16 through the contacts 45 of a relay 46. This relay also completes through its contacts 47 a circuit in shunt to the contacts 18 of the welding contactor 19. This shunt circuit includes a current limiting resistor 49. The relay 46 also controls through its contacts 50 its own holding circuit and the energization of a time delay opening relay 51 which in turn controls the energization of the welding contactor 19. Relay 51 and contactor 19 are direct current devices and are energized through rectifier bridges 52 and 53 from a source of alternating current supply 54.

The relay 46 is energized by the closing of either one of the push button switches 55 or 56 which complete energizing circuits for the relay through contacts 57 and 58 respectively. Once the relay 46 operates, it completes its own holding circuit through its contacts 50 and the contacts 74 of a relay 68. The push button switches 55 and 56 in combination discriminately control through their contacts 59 and 60 the energization of relays 61 and 62 which energize the travel motor 13 for rotation in one direction or the other. The energizing circuit for these relays 61 and 62 includes the contacts 63 of the relay 46.

Push button switches 64 and 65 control through their contacts 66 and 67 the energization of relay 68. These push button switches also in combination discriminately control through their contacts 69 and 70 and the contacts 71 of relay 68 the energization of the travel motor relays 61 and 62.

Relays 46 and 68 are interlocked through circuits including contacts 72 of relay 46 and contacts 71, 73 and 74 of relay 68. The holding circuit for relay 68 is completed through contacts 72 of relay 46 and contacts 71 and 73 of relay 68. The relays 46 and 68 are deenergized by operating the push button switch 75.

A switch 76 is provided for controlling the manner in which the welding operation is stopped. If the switch 76 is open the travel motor 13 is deenergized with the opening of contacts 63 of relay 46 which will occur before the opening of the contacts 18 of the welding contactor 19 whose energization is maintained for a predetermined time through contacts 77 and 78 of relay 51 through the time delay opening characteristic imparted to this relay by its dashpot 79. However, if the switch 76 is closed, the travel motor 13 will be energized until the welding contactor 19 opens it contacts 18 through a circuit established through contacts 78 of relay 51, switch 76, and the contacts 80 of relay 68.

As previously stated, the direction of rotation of the travel motor 13 is controlled by the operation of relays 61 and 62. These relays control the reversal of the connection of the armature 81 of this motor through contacts 82, 83, 84 and 85. The series field 86 of this motor is also connected in circuit with these contacts. A dynamic braking connection is established for the travel motor 13 when relays 61 and 62 are deenergized through an armature circuit including contacts 87 and 88 of these relays and a shunt field circuit including the contacts 89 and 90 of these relays. The energization of the shunt field 91 of the travel motor 13 is controlled by the adjustable resistance 92 which is inserted in circuit therewith upon the operation of either relay 61 or 62.

The system illustrated will be better understood from a consideration of its operation. As previously noted, the switches, relays and regulators are shown in the positions they assume when deenergized.

If the operator desires to initiate a welding operation to the right that continues until the stop switch 75 is operated, he depresses the push button 55. This energizes the operating winding 93 of relay 46 through the following circuit: From one terminal of the source of supply 54 through conductor 94, stop switch 75, conductor 95, contacts 57 of switch 55, conductors 96, 97 and 98, the operating winding 93 of relay 46, and conductors 99 and 100, to the other terminal of the source of supply 54. As soon as the relay 46 closes, it completes its own holding circuit through its contacts 50 as follows: From one terminal of the source of supply 54 through conductor 94, stop switch 75, conductors 95 and 101, contacts 50 of relay 46, conductors 102 and 103, contacts 74 of relay 68, conductors 104 and 98, the operating winding 93 of relay 46, and conductors 99 and 100 to the other terminal of the source of supply 54. The energizing circuits for relay 51 and welding contactor 19 are also completed by the closure of the contacts 50 of the relay 46. The operating winding 105 of relay 51 is energized from one terminal of the source of supply 54 through conductor 94, stop switch 75, conductors 95 and 101, contacts 50 of relay 46, conductors 102 and 103, rectifier bridge 52, across whose output terminals the operating winding 105 of relay 51 is connected, conductor 106, resistor 107 for protecting the rectifier bridge 52, and conductors 108 and 100 to the other terminal of the source of supply 54. When the relay 51 closes its contacts 77 and 78 it completes the energizing circuit for the operating winding 109 of the welding contactor 19 as follows: From one terminal of the source of supply 54 through conductor 110, contacts 78 of relay 51, conductor 111, rectifier bridge 53 across whose output terminals the operating winding 109 of welding contactor 19 is connected through a circuit including contacts 77 of relay 51, conductor 112, contacts 113 of welding contactor 19, and conductors 114 and 100 to the other terminal of the source of supply 54. As soon as the welding contactor 19 operates, a resistance 115 is inserted in circuit with the rectifier bridge 53 for reducing the current output thereof from the pick-up value to the holding value for the operating winding 109 of the welding contactor 19.

The welding contactor 19 is required to handle heavy welding currents and is, consequently, of large size and has a substantial time delay in its operation, for example, a half second or more. While the contacts 18 of this welding contactor are closing in response to the energization of its operating winding 109, a shunt circuit is completed around these contacts through conductor 116, resistance 49, conductor 117, contacts 47 of relay 46 and conductor 118. Relay 46 is of the quick-acting type, and consequently, immediately applies voltage from the source of supply 16 to the welding electrodes 10 and 11 before the welding circuit is completed by the closing of the welding contactor 19. At the same time that the shunt circuit above referred to is completed through the contacts 47 of the relay 46, the energizing circuit for the feed motor 23 and for the operating windings 33 and 34 of the electrode feeding means is completed through the contacts 45 of relay 46 as follows: From one terminal of the source of supply 16 through welding circuit conductor 22, conductors 119 and 120, contacts 45 of relay 46, and conductor 121 to the other terminal of the source of supply 16.

Thus while the welding contactor 19 is closing its contacts 18, the regulator is energized and a control voltage is applied to the welding electrodes 10 and 11 through the above referred to shunt circuit. This control voltage will be substantially the voltage of the source of supply 16, and consequently, greater than the predetermined voltage which the electrode feeding means is set to maintain between the arc welding electrodes 10 and 11. Consequently, the operating winding 41 of the voltage relay 40 will move contact 38 of this relay against the bias of spring 44 into engagement with contact 39 of this relay completing a circuit through the operating winding 33 of the clutch mechanism 36 which will cause elements 27 and 28 of this clutch mechanism to engage one another and establish a connection between the motor 23 and feed rolls 24 which will feed the electrode 10 toward the electrode 11. If a high speed feeding means is employed as is preferable, the electrode 10 will engage the work 11 before the contacts 18 of the welding contactor 19 close. When this occurs, the operating winding 41 of the relay 40 is deenergized and its movable contact 38 engages its contact 37 under the bias of spring 44 of the relay. This, consequently, energizes the operating winding 34 of the clutch mechanism 26 causing elements 27 and 29 to engage one another and establish a connection between the motor 23 and feed rolls 24 which will feed the electrode 10 away from the electrode 11 a short distance. When the electrode 10 leaves the electrode 11, no arc will be established because of the resistor 49 included in the shunt circuit through which control voltage is applied to the electrodes 10 and 11 while the welding contactor is closing. This resistance is of sufficient size to limit the flow of current in this circuit to a value insufficient for establishing an arc between the electrodes 10 and 11. As soon as the electrode 10 leaves the work 11, approximately normal open circuit voltage is again applied to the electrodes 10 and 11 so that the electrode 10 will again be fed toward and into engagement with the work 11. This cycle is repeated rapidly until the welding contactor 19 closes its contacts 18 and applies a source of welding current and voltage to the electrodes. This up and down movement of the electrode over a short path of travel of approximately 1/8 of an inch which continues while the welding contactor is closing makes it possible immediately to strike a welding arc as soon as the welding contactor closes. Because of this up and down movement of the electrode, the welding arc may be established very quickly and welding may proceed in a satisfactory manner as soon as the welding contactor closes.

Because of the speed with which the system just described will establish a welding arc, it is possible to initiate the energization of the travel motor 13 in response to the operation of a starting switch as in the system illustrated. The closure of push button 55 as previously stated causes the work 11 to move to the right. The energizing circuit for the travel motor 13 established by the closure of switch 55 is as follows: From one terminal of the source of supply 54 through conductors 94 and 122, contacts 63 of relay 46, conductors 123 and 124, contacts 60 of switch 56, contacts 70 of switch 65, and contacts 125 of relay 62 through operating winding 126 of relay 61 and conductor 100 to the other terminal of the source of supply 54. Upon operating, relay 61 will close its contacts 82 and 83 connecting the armature 81 of the travel motor 13 to the source of supply 16 through conductor 127, series field 86 of the motor, contacts 82 and 83 of relay 61, and conductor 128. At the same time the dynamic braking connection for this motor 13 is opened at contacts 87 of relay 61 and the energization of the shunt field 91 is reduced to the value determined by adjustable resistance 92 by the opening of contacts 89 of relay 61.

If the operator desires to traverse the work to the right without initiating a welding operation, he depresses the push button switch 64. This switch through its contacts 66 energizes the operating winding 129 of relay 68 through the following circuit: From one terminal of the source of supply 54 through conductor 94, stop switch 75, conductor 95, contacts 66 of switch 64, conductors 130 and 131, the operating winding 129 of relay 68, and conductor 132 to the other terminal of the source of supply 54. This relay by opening its contacts 74 prevents relay 46 from holding in if switch 55 is also closed. However, if both switches 55 and 64 are maintained closed, welding can be accomplished since the closure of switch 55 energizes relay 46 which through its contacts 50 energizes relay 51 and contactor 19. The operation of relay 68 while switch 64 remains closed controls through contacts 70 of switch 65 the energization of relay 61 which controls the operation of the travel motor 13 for travel to the right through the following circuit: From one terminal of the source of supply 54 through conductor 94, stop switch 75, conductor 133, contacts 71 of relay 68, conductor 124, contacts 60 of switch 56, contacts 70 of switch 65, and contacts 125 of relay 62, the operating winding 126 of relay 61, and conductor 100 to the other terminal of the source of supply 54. The relay 61 when energized will operate in the manner just described for controlling the travel motor 13.

It will be noted that switches 55, 56, 64 and 65 and relays 61 and 62 are so interlocked that only when either or both switches 55 and 64 or 56 and 65 are depressed will relays 61 or 62 respond to control the energization of the travel motor 13.

If the operator desires to weld to the left or traverse to the left, this can be accomplished by depressing the push buttons 56 or 65. It is to be noted that the contacts 58 of the switch 56 shunt the contacts 57 of switch 55 and will, consequently, energize the circuits above traced including contacts 57 of switch 55. It will also be noted that the contacts 67 of switch 65 shunt the contacts 66 of switch 64 and will, consequently, energize the circuits above traced including contacts 66 of switch 64. The operation of either switch 56 or 65 will also interrupt the energizing circuit for relay 61 at contacts 60 or 70 or both of these switches, and the operating coil 134 of relay 62 will be energized through contacts 135 of relay 61 and the contacts 59 and 69 of switches 55 and 64 through circuits above described in connection with the operation of the travel motor 13.

As pointed out above, the switch 76 in conjunction with the operation of relay 46 operates to deenergize the travel motor 13 as soon as the stop button 75 is depressed if the switch 76 is open, or at the same time that the welding contactor 19 is deenergized if the switch 76 is closed. This gives at the end of a welding operation the standstill or tapered "burn-back" described and claimed in United States Letters Patent No. 1,701,372—Frank M. Jefts, granted February 5, 1929, and assigned to the assignee of the present invention.

To facilitate arc starting in accordance with my invention as pointed out above, the electrodes should be rapidly fed through a very short distance into and out of engagement with one another by the electrode feeding mechanism before the electrodes are connected to a source of arc welding current and voltage. This requires that the electrode feeding mechanism come into action before the source of welding current is connected to the electrodes. If a quick-acting electrode feeding means is employed as in the system above described, the operating inertia of the welding contactor will interpose sufficient delay in the connection of welding current and voltage to the electrodes to obtain the operation desired. It is apparent, however, that under certain circumstances where a quick-acting feeding means is not employed, the delay in connecting the source of welding current and voltage to the electrodes may be accomplished artificially by the use of dashpots or suitable electrical time delay means associated with the welding contactor.

It is also apparent that many variations in the connections above described may be made without departing from the spirit and scope of my invention. For example, the push button switches 55, 56, 64 and 65 may be used to complete directly the shunt circuit around the contacts 18 of the welding contactor 19 and to energize the electrode feeding mechanism instead of accomplishing this result through the agency of the quick-acting relay 46. Furthermore, it is obvious that the electrode feeding mechanism described is one of many types that may be employed. My invention has been used when employing the electrode feeding mechanism described and claimed in U. S. Letters Patent 2,175,017, William D. Cockrell, granted October 3, 1939, for Electric Control Circuit, and assigned to the assignee of the present invention. The electrode feeding mechanism of this application is of the tube circuit type and under certain circumstances is to be preferred to the electro-mechanical type illustrated and described above.

It is also apparent that my invention is not limited to the use of an electromagnetic switch for controlling the application of welding current to the electrodes 10 and 11 and that other devices may be employed. For example, when welding with alternating current, a saturable reactor control might be employed. It is also apparent that the travel motor 13 may be controlled in response to the operation of the welding contactor. Where high travel speeds are employed, this may be preferable to the arrangement above described and illustrated. The output of a generator having the desired drooping voltage characteristic may be substituted for the circuit including the regulating resistance 17 above described.

Consequently, while I have shown and described above a particular embodiment of my invention, it is obvious to those skilled in the art that changes and modifications may be made without departing from my invention. I, therefore, aim, in the appended claims to cover all such changes and modifications as fall within the true spirit and scope of my invention.

What I claim as new and desire to secure by Letters Patent of the United States, is:

1. An arc welding system comprising means responsive to the voltage across a plurality of co-operating arc welding electrodes for feeding said electrodes toward one another when the voltage across them is greater than a predetermined value and for feeding said electrodes away from one another when the voltages across them is less than a predetermined value, a source of arc welding current and voltage, means for supplying said source of arc welding current and voltage to said electrodes, said means including a device having an operating inertia greater than the operating inertia of said feeding means, a source of control voltage of greater value than said predetermined value above referred to, and means for connecting said control voltage to said electrodes and for energizing said feeding means during the operating period of said device.

2. An arc welding system comprising means responsive to the voltage across a plurality of co-operating arc welding electrodes for feeding said electrodes toward one another when the voltage across them is greater than a predetermined value and for feeding said electrodes away from one another when the voltage across them is less than a predetermined value, a source of arc welding current and voltage, means for supplying said source of arc welding current and voltage to said electrodes, said means including a device having an operating inertia greater than the operating inertia of said feeding means, a source of control voltage of greater value than said predetermined value above referred to, means for connecting said control voltage to said electrodes and for energizing said feeding means during the operating period of said device, and means for limiting the current supplied to said electrodes by said source of control voltage to a value insufficient for establishing an arc between said electrodes.

3. An automatic arc welding system comprising a source of arc welding current, means including the contacts of a slow-acting switch for connecting said source of arc welding current to a plurality of cooperating arc welding electrodes, quick-acting means responsive to the voltage across said electrodes for feeding said electrodes toward one another when the voltage across them is greater than a predetermined value and for feeding said electrodes away from one another when the voltage across them is less than a predetermined value, and means for closing said switch and while said switch is closing for energizing said feeding means and applying to said electrodes a control voltage greater than said predetermined voltage above referred to.

4. An automatic arc welding system comprising a source of arc welding current, means including a switch for connecting said source of arc welding current to a plurality of cooperating arc welding electrodes, means operating more quickly than said switch for feeding said electrodes toward one another when the voltage across them is greater than a predetermined value and for feeding said electrodes away from one another when the voltage across them is less than a predetermined value, and means for closing said switch and while said switch is closing for energizing said feeding means and applying to said electrodes a control voltage greater than said predetermined voltage above referred to.

5. An automatic arc welding system comprising a source of arc welding current, means including a switch for connecting said source of arc welding current to a plurality of cooperating arc welding electrodes, means operating more quickly than said switch for feeding said electrodes toward one another when the voltage across them is greater than a predetermined value and for feeding said electrodes away from one another when the voltage across them is less than a predetermined value, means for closing said switch and while said switch is closing for energizing said feeding means and applying to said electrodes a control voltage greater than said predetermined voltage above referred to, and means for limiting to a value insufficient for maintaining an arc the current flow between said electrodes as a result of applying said control voltage thereto.

6. An automatic arc welding system comprising a source of arc welding current and voltage, a slow-acting electromagnetic switch having an operating winding and contacts closed in response to the energization of said winding, means including the contacts of said switch for connecting said source of arc welding current and voltage to a plurality of arc welding electrodes, quick-acting means including an electric motor and a regulator responsive to the voltage across said electrodes for feeding said electrodes toward one another when the voltage across them is greater than a predetermined value and for feeding said electrodes away from one another when the voltage across them is less than a predetermined value, an energizing circuit for said electric motor, means including a circuit in shunt to the contacts of said electromagnetic switch for supplying to said electrodes a control voltage greater than said predetermined voltage above referred to, and switching means for initiating the energization of the operating winding of said electromagnetic switch and simultaneously therewith completing the energizing circuit of said electric motor and the circuit in shunt to the contacts of said electromagnetic switch.

7. An automatic arc welding system comprising a source of arc welding current and voltage, a slow-acting electromagnetic switch having an operating winding and contacts closed in response to the energization of said winding, means including the contacts of said switch for connecting said source of arc welding current and voltage to a plurality of arc welding electrodes, quick-acting means including an electric motor and a regulator responsive to the voltage across said electrodes for feeding said electrodes toward one another when the voltage across them is greater than a predetermined value and for feeding said electrodes away from one another when the voltage across them is less than a predetermined value, an energizing circuit for said electric motor, means including a circuit in shunt to the contacts of said electromagnetic switch for supplying to said electrodes a control voltage greater than said predetermined voltage above referred to, switching means for initiating the energization of the operating winding of said electromagnetic switch and simultaneously therewith completing the energizing circuit of said electric motor and the circuit in shunt to the contacts of said electromagnetic switch, and means in said circuit in shunt to the contacts of said electromagnetic switch for limiting the flow of current through said circuit to a value insufficient for establishing a welding arc between said electrodes 8. An automatic arc welding system comprising a source of arc welding current, means including a switch for connecting said source of arc welding current to a plurality of cooperating arc welding electrodes, means operating more quickly than said switch for feeding said electrodes toward one another when the voltage across them is greater than a predetermined value and for feeding said electrodes away from one another when the voltage across them is less than a predetermined value, means for traversing the arc established between said lectrodes along a line of welding, means for energizing said traversing means and for closing said switch at substantially the same time, and means for energizing said feeding means and for applying to said electrodes a control voltage greater than said predetermined voltage above referred to during the time required for the closing of said switch and for the starting of said traversing means.

9. An automatic arc welding system comprising a source of arc welding current and voltage, a slow-acting electromagnetic switch having an operating winding and contacts closed in response to the energization of said winding, means including the contacts of said switch for connecting said source of arc welding current and voltage to a plurality of arc welding electrodes, quick-acting means including an electric motor and a regulator responsive to the voltage across said electrodes for feeding said electrodes toward one another when the voltage across them is greater than a predetermined value and for feeding said electrodes away from one another when the voltage across them is less than a predetermined value, an energizing circuit for said electric motor, means including a circuit in shunt to the contacts of said electromagnetic switch for supplying to said electrodes a control voltage greater than said predetermined voltage above referred to, means for traversing the arc established between said electrodes along a line of welding, and switching means for simultaneously initiating the energization of said traversing means and the operating winding of said switch and while said switch is closing and said traversing means is starting for completing the energizing circuit of said electric motor and the circuit in shunt to the contacts of said electromagnetic switch.

10. An automatic arc welding system comprising a source of arc welding current and voltage, a slow-acting electromagnetic switch having an operating winding and contacts closed in response to the energization of said winding, means including the contacts of said switch for connecting said source of arc welding current and voltage to a plurality of arc welding electrodes, quick-acting means including an electric motor and a regulator responsive to the voltage across said electrodes for feeding said electrodes toward one another when the voltage across them is greater than a predetermined value and for feeding said electrodes away from one another when the voltage across them is less than a predetermined value, an energizing circuit for said electric motor, means including a circuit in shunt to the contacts of said electromagnetic switch for supplying to said electrodes a control voltage greater than said predetermined voltage above referred to, means for traversing the arc established between said electrodes along a line of welding, switching means for simultaneously initiating the energization of said traversing means and the operating winding of said switch and while said switch is closing and said traversing means is starting for completing the energizing circuit of said electric motor and the circuit in shunt to the contacts of said electromagnetic switch, and means in said circuit in shunt to the contacts of said electromagnetic switch for limiting the flow of current through said circuit to a value insufficient for establishing a welding arc between said electrodes.

11. An automatic arc welding system comprising means including a device for controlling the application of arc welding current and voltage to a plurality of cooperating arc welding electrodes, means for operating said device to supply arc welding current and voltage to said electrodes, and means for feeding said electrodes through a very short distance rapidly into and out of engagement with one another during the period required for operating said device to supply said arc welding current and voltage to said electrodes and for feeding said electrodes relative to one another to maintain an arc of predetermined voltage therebetween after said device has operated to supply arc welding current and voltage to said electrodes.

12. An automatic arc welding system comprising a source of arc welding current and voltage, means including a switch for connecting said source of arc welding current and voltage to a plurality of cooperating arc welding electrodes, means for closing said switch, and means for feeding said electrodes through a very short distance rapidly into and out of engagement with one another during the closing period of said switch and for feeding said electrodes relative to one another to maintain an arc of predetermined voltage therebetween after said switch has closed.

13. An automatic arc welding system comprising a source of arc welding current and voltage, means including a switch for connecting said source of arc welding current and voltage to a plurality of cooperating arc welding electrodes, means for closing said switch, and means for feeding said electrodes through a distance of about one-sixteenth of an inch rapidly into and out of engagement with one another during the closing period of said switch and for feeding said electrodes relative to one another to maintain an arc of predetermined voltage therebetween after said switch has closed.

JAMES T. CATLETT.